O. W. STOW.
Stovepipe Elbow.
No. 51,240.
Patented Nov. 28, 1865.
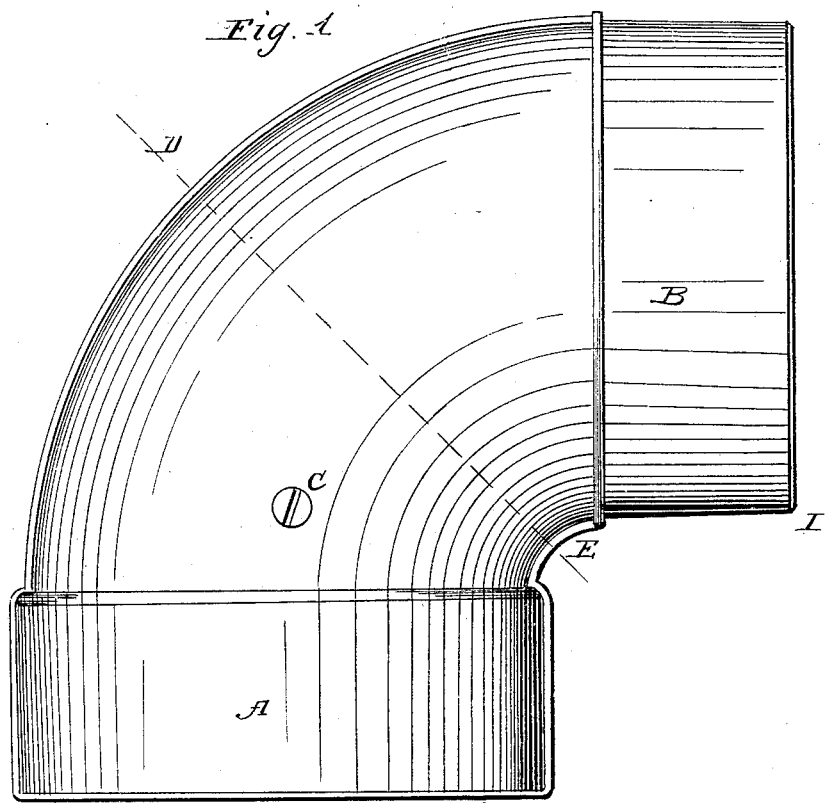
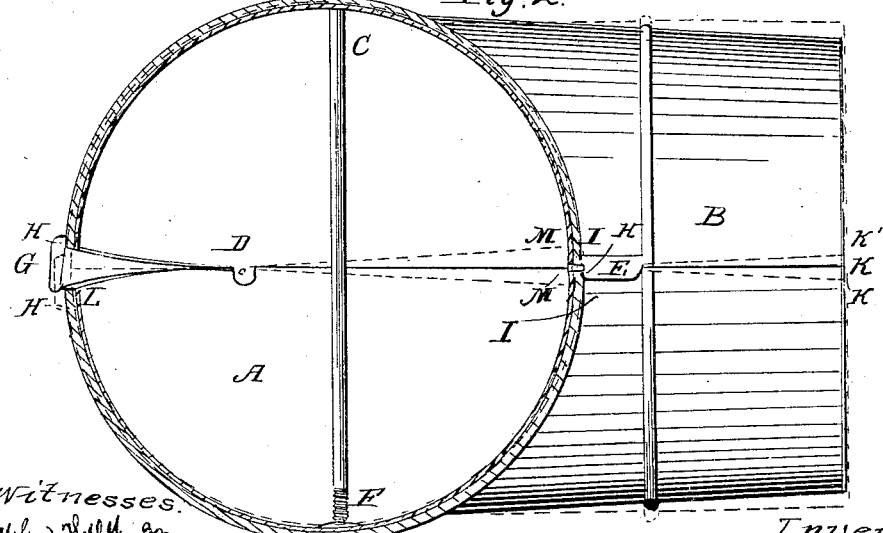

UNITED STATES PATENT OFFICE.

ORSON W. STOW, OF PLANTSVILLE, CONNECTICUT.

STOVE-PIPE ELBOW.

Specification forming part of Letters Patent No. 51,240, dated November 28, 1865.

*To all whom it may concern:*

Be it known that I, ORSON W. STOW, of Plantsville, in the county of Hartford and State of Connecticut, have invented a new and useful Improvement in Stove-Pipe Elbows; and I do hereby declare that the following is a full, clear, and exact description of the construction of the same, and also of its operation, which will enable others skilled in the art to make and use the same, reference being had to the accompanying drawings, forming a part of this specification, in which—

Figure 1 is a side view of my invention. Fig. 2 is an end view, showing the inside of the elbow and one end.

Similar letters of reference indicate like parts.

This invention consists in making stove-pipe elbows that are made in two parts expand one end while the other contracts, whereby the elbow is made to fit different sizes of pipe and to firmly grasp and hold the pipe to which it is attached.

A represents the large end of the elbow. B represents the small end of the same. C represents the bolt that holds the parts of the elbow together, and is placed between the large end A and the axis of motion D.

The elbow is made in two parts, as shown in Fig. 2. D E is the line of the axis of motion, on which the parts of the elbow swivels as the bolt C is tightened.

F, Fig. 2, is the nut of the bolt C.

The red lines on the end B, also the red lines from G to I, Fig. 2, show the position of the elbow when the end A is closed and the end B is opened. The dark lines L M and M K show the position of the elbow when the end A is opened and the end B closed.

It will be noticed that the edge of the elbow is cut away from the point D, Fig. 2, to L L, and when the end B is opened the edges D M assume the position shown at D I D I, in red lines, and the opening E K becomes E K' E K', also shown in red lines I I, so that the parts of the elbow can turn on the points D E.

H H are ribs or flanges, Fig. 2, fastened on or cast on the outside of one of the parts of the elbow, to cover the edges that are cut away.

From this description of my elbow it will be seen that by turning the bolt C the end A will be closed on the pipe that enters that end of the elbow, while at the same time, and by the same action of the bolt C, the end B of the elbow will be expanded and made to fill the pipe that goes on that end.

Having thus described my invention, I do not claim making an elbow in two parts, as in the patent of Perry, January 3, 1865; neither do I claim holding such parts together by means of a bolt; but

I do claim as new and desire to secure by Letters Patent—

Making the two parts of the elbow to turn or swivel on points or pivots D E, in combination with the bolt C, as and for the purposes set forth.

ORSON W. STOW.

Witnesses:
STEPHEN WALKLEY, Jr.,
ENOS E. STOW.